US007228560B2

(12) United States Patent
Panabaker

(10) Patent No.: US 7,228,560 B2
(45) Date of Patent: Jun. 5, 2007

(54) PERFORMING SERVER SIDE INTERACTIVE TELEVISION

(75) Inventor: Ruston Panabaker, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 1062 days.

(21) Appl. No.: 09/971,473

(22) Filed: Oct. 5, 2001

(65) Prior Publication Data

US 2003/0070175 A1   Apr. 10, 2003

(51) Int. Cl.
*H04N 7/173* (2006.01)
(52) U.S. Cl. .................. 725/114; 725/109; 725/111; 725/112; 725/120
(58) Field of Classification Search ........ 725/109–114, 725/136, 120
See application file for complete search history.

(56) References Cited

U.S. PATENT DOCUMENTS

| | | | | |
|---|---|---|---|---|
| 5,892,508 A | * | 4/1999 | Howe et al. | 725/131 |
| 5,961,603 A | * | 10/1999 | Kunkel et al. | 709/229 |
| 5,982,445 A | * | 11/1999 | Eyer et al. | 348/461 |
| 6,118,498 A | * | 9/2000 | Reitmeier | 348/725 |
| 6,757,909 B1 | * | 6/2004 | Maruo et al. | 725/111 |
| 6,792,617 B2 | * | 9/2004 | Gorbatov et al. | 725/110 |
| 6,804,824 B1 | * | 10/2004 | Potrebic et al. | 725/38 |
| 7,020,888 B2 | * | 3/2006 | Reynolds et al. | 725/34 |
| 2001/0047298 A1 | * | 11/2001 | Moore et al. | 705/14 |
| 2002/0026642 A1 | * | 2/2002 | Augenbraun et al. | 725/109 |
| 2002/0059644 A1 | * | 5/2002 | Andrade et al. | 725/136 |

OTHER PUBLICATIONS

Vuorimaa, P., "A Digital Television Service Architecture", *2000 IEEE International Conference on Multimedia and Expo, ICME2000*, Proceedings vol. III—Wednesday, Jul. 30-Aug. 2, 2000, pp. 1411-1414.

Cheng, Li-Te, "Footprint—A Foot-based Wearable Computer Personal Context Interface", *2000 Canadian Conference on Electrical and Computer Engineering*, vol. 1, Mar. 7-10, 2000, pp. 32-36.

"DVX Technology-Carousel Delivery Mechanism for Interactive Services in Digital Broadcasting", Feb. 1998, pp. 36-44, *Matsushita Technical Journal*, vol. 44, No. 1.

Selcuk, K.; Hwang, E.; and Subrahmanian, V.S.; "An Event-Based Model for Continuous Media Data on Heterogeneous Disk Servers", *Multimedia Systems*, vol. 6, No. 4, 1998, pp. 251-270.

"Hardware and Applications for Interactive TV and Video in the Home," *ITG-Fachbericht Conference*, No. 156, 1999, pp. 109-113.

"Implementation of an MPEG-2 VOD System in ATM Networks", Apr. 1998.

* cited by examiner

*Primary Examiner*—Kieu-Oanh Bui
(74) *Attorney, Agent, or Firm*—Workman Nydegger

(57) ABSTRACT

A method for providing enhanced programming to an entertainment module where the display of the enhanced programming is prepared remotely from the entertainment module. The method includes a step for analyzing a programming transmission stream deliverable to an entertainment module, remotely from the entertainment module, to identify whether the transmission stream includes at least one enhanced programming control signal. In the event that the transmission stream includes at least one enhanced programming control signal, a step for preparing, remotely from the entertainment module, a visual representation of the enhanced programming based upon the at least one enhanced programming control signal. Following preparing the enhanced programming by the preparing step, a step for delivering the visual representation of the enhanced programming to the entertainment module.

47 Claims, 9 Drawing Sheets

PERFORMING SERVER SIDE INTERACTIVE TELEVISION

BACKGROUND OF THE INVENTION

1. The Field of the Invention

The present invention relates to systems and methods for providing viewers with an enhanced programming experience. More specifically, the present invention relates to giving a viewer an enhanced programming experience while remotely preparing the enhanced programming in accordance with the selections of the viewer.

2. The Prior State of the Art

For numerous years, homes, offices, and other buildings have accessed television programming through airwave broadcasts, cable providers, satellite transmission, and other communication channels. Televisions provide viewers with a varied assortment of entertainment, news, and educational programming. From the first broadcasts to current television programming, viewers gather a wealth of knowledge, while being entertained. With advances in communication technology and computer systems in recent years, television broadcast viewers no longer are limited to merely watching a television screen. Instead, television broadcast viewers may watch programming on a computer monitor or display, while performing a variety of other tasks, such as word processing, surfing the Internet, playing games, and the like.

Of particular interest, in recent years there has been an explosion with the availability of enhanced programming experiences associated with traditional television broadcast programming. Such enhanced programming experiences allow viewers to interact with or "feel" that they have become part of the television broadcast. For example, the enhanced programming may allow a viewer to "play-along" with participants in a game show by simultaneously answering questions and simulating accumulating points, money, prizes, and the like. Additionally, the current enhanced programming experiences allow viewers to obtain a more thorough understanding of a particular television broadcast. This may be achieved by connecting with a web site that has information relevant to the television broadcast, such as, for example, connecting to a sports related web site to obtain a baseball player's statistics.

Numerous attempts have been made to provide such enhanced programming or interactivity in a straightforward and efficient manner. From the inception of enhanced programming, manufacturers and providers have attempted to develop hardware, such as set-top boxes, and associated software to give a television broadcast viewer an interactive experience, whether the experience eliminates the television broadcast or combines enhanced programming with the television broadcast. The capabilities of each set-top box may vary from complex to unsophisticated set-top boxes. The more complex set-top boxes render Hypertext Mark-up Language (HTML) documents, storing large quantities of enhanced programming data and files, and providing the viewer with an enhanced programming experience. The less complicated set-top boxes ("low-end" set-top boxes) may only be capable of providing the viewer with the number of the television channel currently watched with no enhanced programming content.

With reference to FIG. 1, depicted is a schematic representation of an existing system for providing viewers with an enhanced programming experience using complex advanced receivers or set-top boxes. As shown, a system 10 includes a cable or satellite provider head end 12. The head end 12 represents the cable or satellite provider's hardware and/or software components or modules that receive broadcast programming. For example, head end 12 receives broadcast programming, as represented by the video-in line, and delivers the broadcast programming to an advanced receiver 14, such as an advanced set-top box. The advanced receiver 14 demodulates the signal received from head end 12 and delivers a demodulated signal to a display device 16 that displays the broadcast programming to a viewer.

Additionally, head end 12, through a proxy server 22, is capable of retrieving enhanced programming content from a web server 20 via a network 18. The enhanced programming content can be retrieved and delivered to advanced receiver module 14 before the enhanced programming content is to be displayed to the viewer or can be retrieved by proxy server 22 upon receiving a request from advanced receiver module 14 for such enhanced programming content.

In either case above, advanced receiver module 14 is capable of identifying the availability of enhanced programming content and notifying the viewer of such availability. One manner by which advanced receiver module 14 identifies the availability of enhanced programming content is to track metadata included within the broadcast programming that indicates when enhanced programming content is to be viewed.

While these techniques of providing enhanced programming content to viewers have been used successfully with relatively sophisticated set-top boxes, there are millions of existing, low-end set-top boxes that are not compatible with conventional methods for displaying enhanced programming content. Moreover, because of cost constraints, many more low-end set-top boxes are manufactured each year. Viewers using such low-end set-top boxes have been unable to view enhanced programming content without replacing their set-top boxes, which can be prohibitively expensive for many viewers.

In light of the above, it would be desirable to have a system that allows low-end set-top boxes and receivers to provide a viewer with an enhanced programming experience, thereby limiting the need for the viewer to purchase more complex and expensive set-top boxes and receivers.

SUMMARY OF THE INVENTION

In one embodiment of the present invention, systems and methods are provided that give a viewer an enhanced programming experience with a receiver that is otherwise incapable of providing the viewer with an enhanced programming experience. In general, the methods of the invention can be characterized as a server or head end approach to providing enhanced programming content, whereby the enhanced programming content is processed or created at a server or head end and then transmitted to the remote set-top box. In this manner, low-end set-top boxes can receive enhanced programming content without being required to individually retrieve and process the enhanced programming content and integrate the enhanced programming content with the conventional television content.

As disclosed previously, typical existing set-top boxes and receivers may have various configurations ranging from those that access information on the Internet or some other wide area network (WAN) to those of low-end set-top boxes, which only deliver programming to the viewer, with little other information or data. To overcome the limitations associated with the low-end set-top boxes and receivers that otherwise only deliver programming to the viewer, systems and methods for providing an enhanced programming experience via a low-end set-top box or receiver are disclosed herein. Further, although the present invention is illustratively described with respect to low-end or less sophisticated set-top boxes and receivers, the broad principles of the invention are applicable for other types of set-top boxes and receivers. For example, high-end or complex set-top boxes can utilize the methods and functions of the present invention to deliver an enhanced programming experience.

One of the modules implemented according to the invention is an entertainment module. The entertainment module is configured to display programming to a viewer and to optionally display enhanced programming content to the viewer. For instance, the entertainment module incorporates a receiver or set-top box with a display unit or device that displays the programming or enhanced programming content to the viewer.

The enhanced programming experience is achieved by including enhanced programming control signals, such as Advanced Television Enhancement Forum (ATVEF) control signals, within the programming that is accessed and used to identify (i) the availability of enhanced programming content deliverable to the viewer; (ii) where the enhanced programming content is stored; (iii) when the enhanced programming content is to be delivered to a delivery module; and/or (iv) what enhanced programming content is to be delivered.

Typically, more complex and sophisticated set-top boxes and receivers access and perform the above analysis of the control signals. The present invention provides substantially the same enhanced programming experience that has been available via such complex and sophisticated set-top boxes and receivers through a simple and unsophisticated set-top box or receiver.

Another module implemented according to the invention is an enhancement module, which is located at a head end or server that is remote from the entertainment module. The enhancement module is configured to identify the occurrence of the enhanced programming control signals and to respond thereto by creating or retrieving the enhanced programming content. The enhancement module, which typically has greater computing resources than a set-top box associated with the entertainment module, generates a sequence of images using, for example, an MPEG format, that represents the enhanced programming content that can be delivered to the entertainment module.

The viewer can provide input to the entertainment module to request initiation of transmission of the enhanced programming content from the remote enhancement module to the local entertainment module. Because the enhancement module has already generated the enhanced programming content, the receiver or set-top box of the entertainment module can display the enhanced programming content without being required to retrieve or process the enhanced programming content as has been required of set-top boxes using conventional enhanced programming processes.

In this manner, enhanced programming techniques according to the present invention identify enhanced programming content associated with programming that is to be delivered to an entertainment module, prepare such enhanced programming content remotely from the entertainment module into a form that the entertainment module may present to the viewer, and upon receiving input from the viewer, delivers the enhanced programming content to the entertainment module.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims. Further, such features of the present invention may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention extends to both systems and methods for providing an enhanced programming experience through receivers or set-top boxes that typically are otherwise incapable of giving a viewer such an enhanced programming experience. Alternatively, such an enhanced programming experience can be provided using the principles of the present invention with receivers or set-top boxes that are capable of giving a viewer the enhanced programming experience. Further, the present invention provides various systems and methods for creating a visual representation of enhanced programming content that is deliverable to a receiver or set-top box without the receiver or set-top box having to retrieve, interpret, or render the images before displaying the same to the viewer. Additionally, the present invention substantially negates the need for the set-top box or receiver to access the source of the enhanced programming content, such as via the Internet or some other wide area network; while providing a visual representation of the enhanced programming content that gives the viewer an enhanced programming experience.

The embodiments of the present invention comprises one or more special purpose or general purpose computers including computer hardware, as discussed in detail below. Receivers and set-top boxes that enhance the capabilities of conventional televisions represent an example of a special purpose computer. The embodiments may further comprise multiple computers linked in a networked environment.

Figure 1:
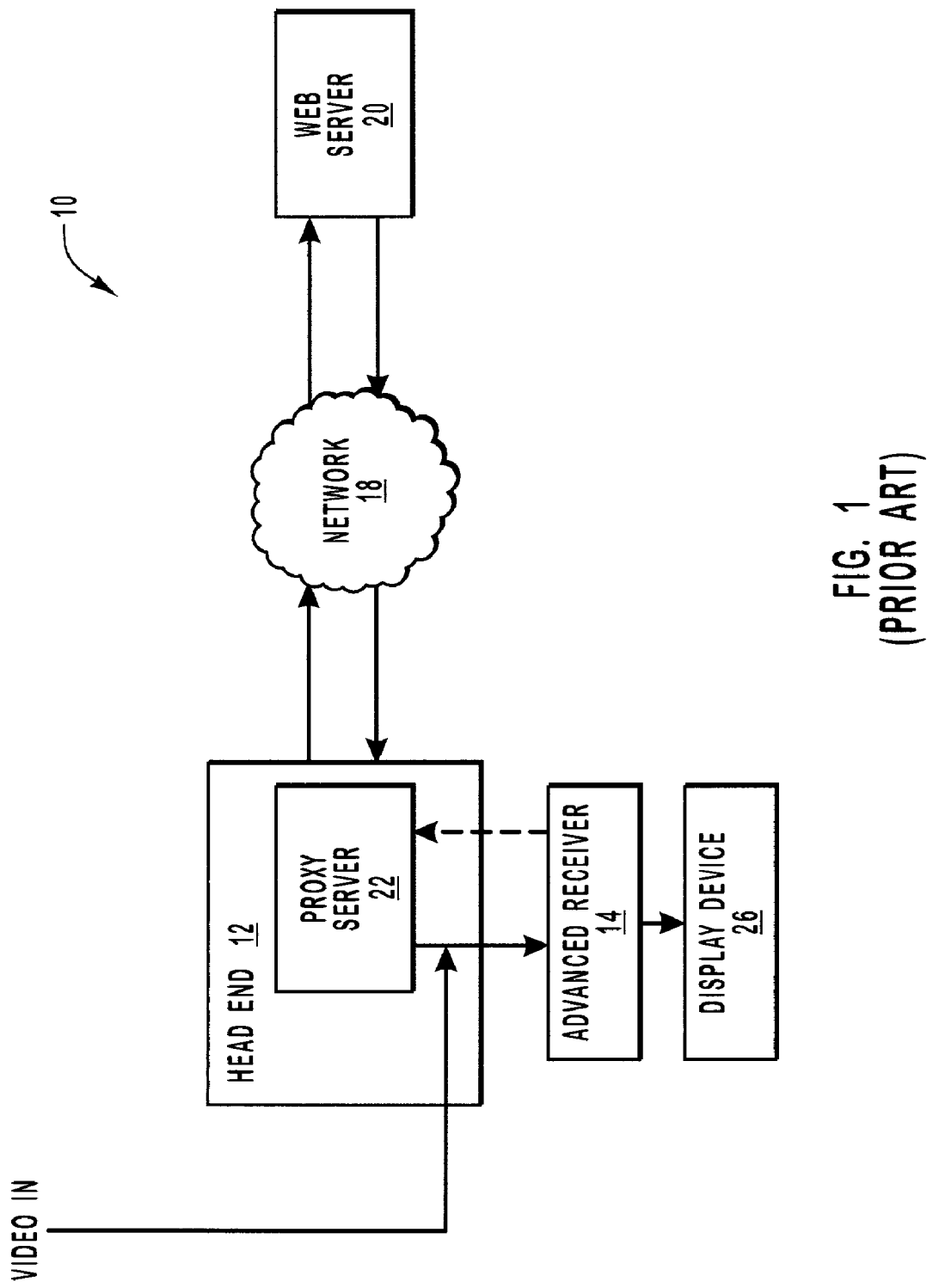
FIG. 1 illustrates a prior art system for delivering enhanced programming content to an entertainment module that includes an advanced receiver and a display device.
Figure 2:
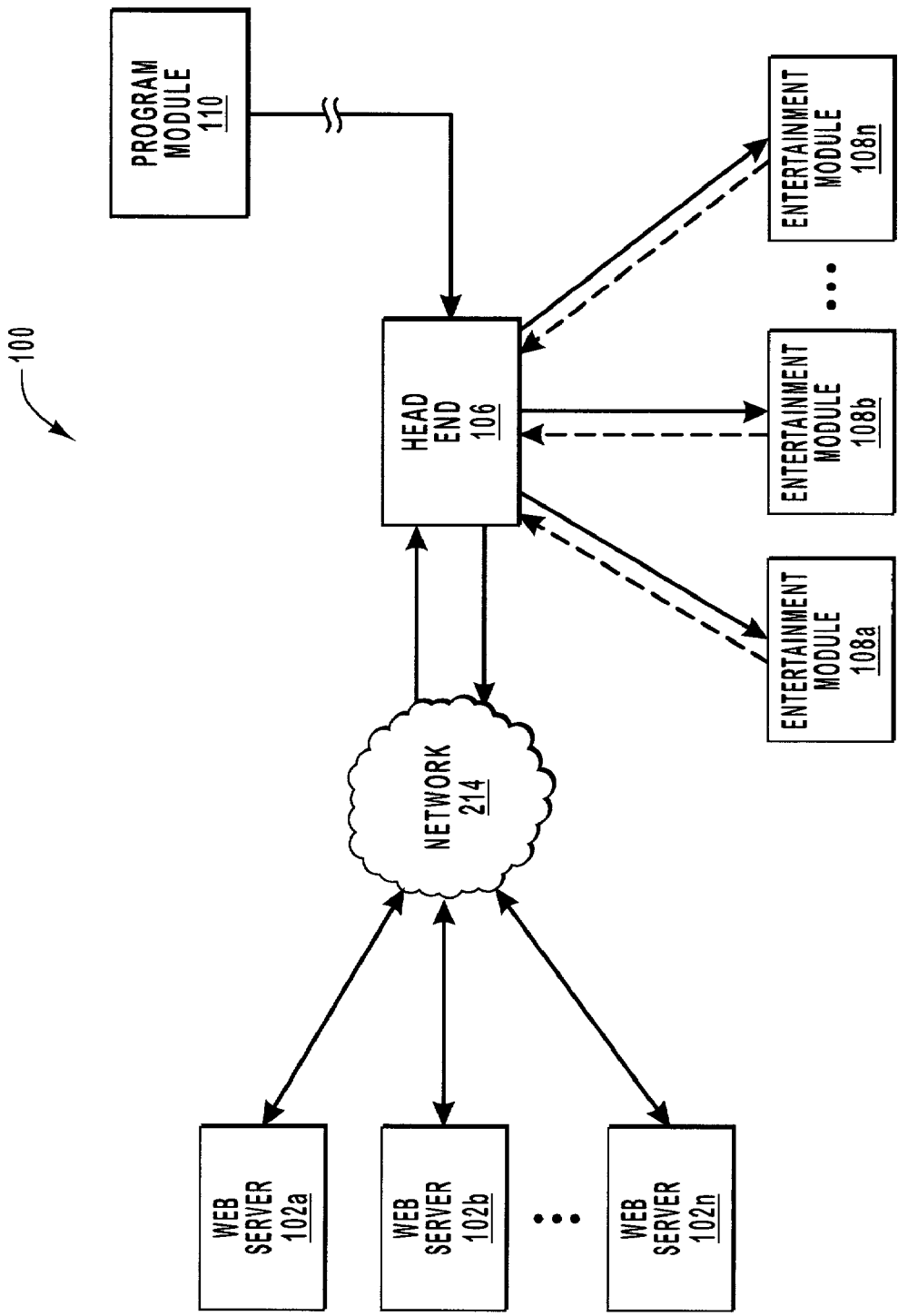
FIG. 2 illustrates an exemplary system that provides a suitable operating environment for the present invention.

Referring now to FIG. 2, depicted is a schematic representation of one exemplary system of the present invention. As shown, a system 100 includes a cable or satellite provider head end 106 that communicates with web servers 102a–102n via a network 104, such as the Internet, a local area network, a wide area network, a wireless network, or the like. The head end 106 receives broadcast programming from a program module 110 and delivers the same to one or more entertainment modules 108a–108n. The program module 110 delivers network, cable, or satellite, or other such programming to head end 106 for delivery to entertainment modules 108a–108n. For example, program module 110 may be a signal source with associated hardware and/or software modules and components. Illustratively, program module 110 may be a multi-channel signal source that delivers multiple signals via satellite, cable terrestrial antennae, and the like, and many such program modules can be used to deliver television programming to head end 106.

In addition to receiving programming from program module 110, head end 106 receives signals from entertainment modules 108a–108n that indicate that the viewer has requested enhanced programming content. For example, when an entertainment module 108a identifies the availability of enhanced programming content and a viewer utilizing an input device requests such enhanced programming content, head end 106 retrieves the requested enhanced programming content, such as from storage or from web servers 102a–102n. Additionally, head end 106 renders the enhanced programming content and delivers the rendered enhanced programming content to the particular entertainment module requesting the enhanced programming content, such that the entertainment module can display the enhanced programming content without being required to retrieve or process the enhanced programming content as has been required of set-top boxes using conventional enhanced programming techniques.

In another embodiment of the present invention, head end 106 tracks the availability of enhanced programming content associated with the programming delivered to entertainment module 108a–108n. The head end 106 maintains a table or list of the available enhanced programming content for each program received from program module 110. When a viewer through entertainment module 108a–108n makes a general request for any available enhanced programming content associated with the displayed programming, head end 106 searches the table or list of the available enhanced programming content to identify which enhanced programming, if any, is available for display to a viewer utilizing entertainment module 108a–108n. Thereafter, head end 106 retrieves the enhanced programming content either from storage or from the enhanced programming content source, i.e., one or more of web servers 102a–102n, and renders the enhanced programming content. Subsequently, head end 106 delivers the rendered enhanced programming content to the requesting entertainment module 108a–108n.

Figure 3:
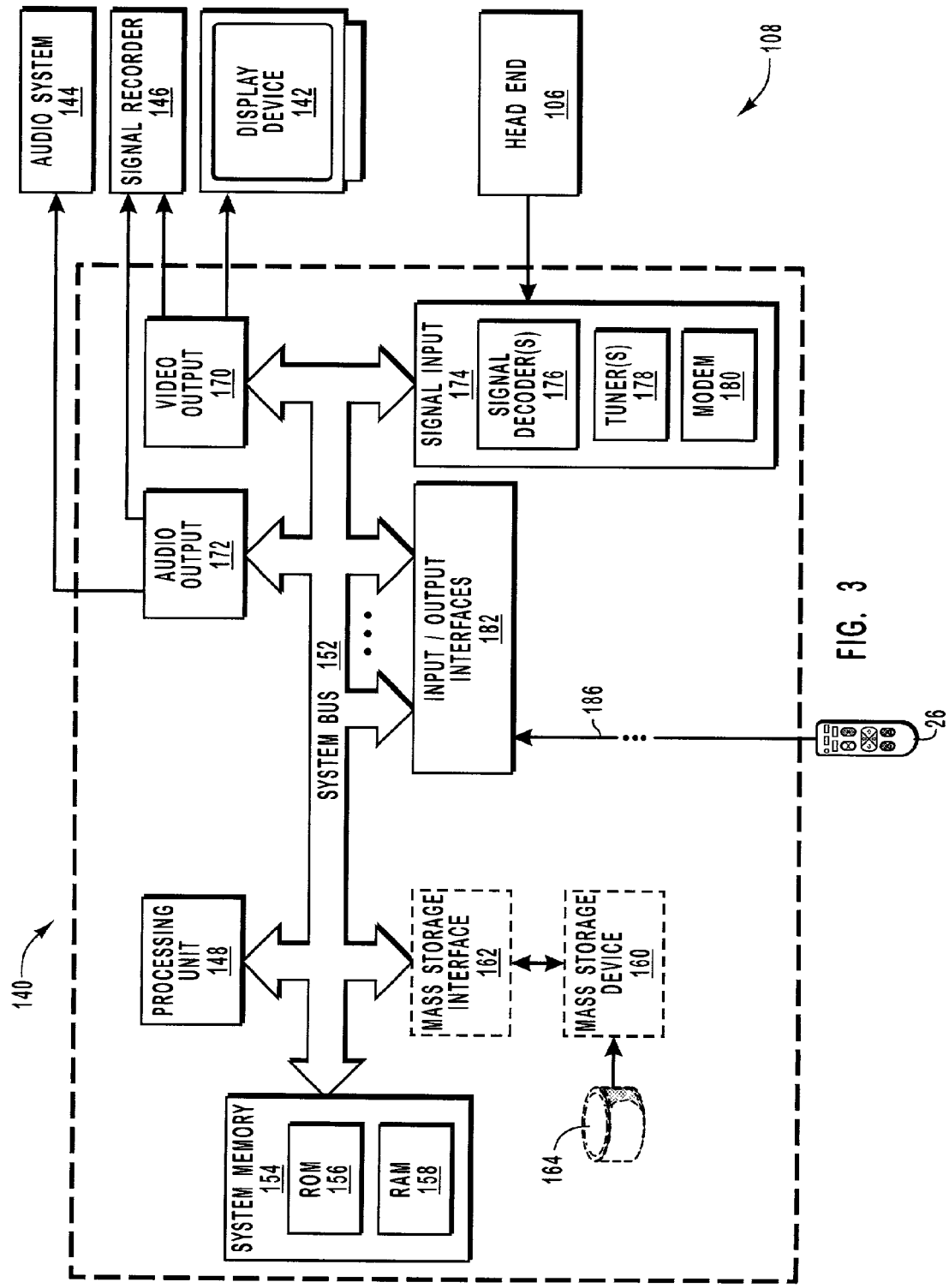
FIG. 3 illustrates a schematic representation of one embodiment of an entertainment module of FIG. 2.

Referring now to FIG. 3, depicted is a schematic representation of one exemplary entertainment module 108. It is noted that any of a wide variety of set-top boxes other than that illustrated in FIG. 3 can be used with the invention. Indeed, relatively low-end set top boxes, such as those that have relatively small computing resources or that lack some elements of entertainment module 108, can significantly benefit from the invention, since such low-end set-top boxes have previously been incapable of displaying enhanced programming content.

Generally, entertainment module 108 includes a special purpose or general-purpose computer or special purpose processing device including various computer hardware and/or software known by one skilled in the art for receiving signals from a broadcast programming source or some other source for enhancing the capabilities of conventional televisions. Entertainment module 108 can include a cable television box, a digital video broadcasting system ("DVB"), some other type of digital satellite system receiver ("DSS"), or another type of set-top box with Internet capabilities.

As illustrated, entertainment module 108 can include a receiver module 140, a display device 142, an audio system 144, and a signal recorder 146. Generally, receiver module 140 includes a central processing unit 148 that uses computer-executable instructions implemented in software and/or hardwired logic circuitry to perform various functions. These computer-executable instructions, such as program modules, cause receiver module 140 and/or entertainment module 108 to perform a certain function or group of functions. Generally, program modules can include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processing unit 148 can be coupled via a system bus 152, which interconnects various other system components of receiver module 140 and/or entertainment module 108. Processing unit 148 executes software designed to implement features of receiver module 140 and/or entertainment module 108 including the features of the present invention. Processing unit 148 can contain circuitry used to implement certain functions of receiver module 140 and/or entertainment module 108. Instructions, data, and other software used to operate processing unit 148 can be stored in a system memory 154, such as read-only memory ("ROM") 156 and/or in random-access memory ("RAM") 158. Optionally, receiver module 140 can include any mass storage device 160, which is coupled to a mass storage interface 162, as illustrated in dotted lines. ROM 156, RAM 158 and mass storage device 160 are communicatively coupled to processing unit 148 so as to be readable by processing unit 148 and so that data may be written from processing unit 148 to RAM 158 and possibly mass storage device 160.

Optional mass storage device 160 can be a magnetic hard disk 164 or any other magnetic, optical, or other mass memory device that is capable of storing data. Any desired computer-readable instructions or data, including application programs and other program modules can be stored in mass storage device 160. Mass storage device 160 is one structure capable of performing the function of a computer-readable media for carrying or having computer-executable instructions or data structures stored thereon. In addition, mass storage device 160 may be used to store and retrieve received media content, such as a media stream or other data delivered to receiver module 140 and/or entertainment module 108. This computer-readable media can be any available media that can be accessed by a general purpose or special purpose computer.

By way of example, and not limitation, such computer-readable media can comprise physical storage media such as RAM, ROM, EEPROM, CD-ROM or other optical disk storage, magnetic disk storage or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to receiver module 140 and/or entertainment module 108 or some remote computer, the receiver module 140, entertainment module 108 and remote computer, such as but not limited to head end 106, properly view the connection as a computer-readable medium. Thus, such a connection is also properly termed a computer-readable medium. Combinations of the above should also be included within the scope of computer-readable media.

As illustrated, receiver module 140 communicates with display device 142, such as a television display, a flat panel display, a projection display, a computer monitor, or any other device capable of displaying viewable image data, through a video output 170 and variety of different communication line connections known to one skilled in the art in light of the teaching contained herein. Additionally, receiver module 140 can communicate with audio system 144, such as one or more speakers for emitting sound data through an audio output 172 and/or a signal recorder 146, such as a video cassette recorder ("VCR"), capable of receiving video and/or audio data through video output 170 and audio output 172 and recording the data on a storage medium.

The receiver module 140 can include a signal input 174, which receives programming from head end 106. The head end 106 delivers single or multiple channels of programming and enhanced programming content to signal input 174 via one or more different communication line connections, known to one skilled in the art, such as but not limited to electromagnetic radiation connection, such as wireless, UHF, VHF, microwave transmission, or the like, cable connection, or optic connection. The signal input 174, alone or in combination with processing unit 148 can search the programming to identify metadata that defines the availability of enhanced programming content associated with the programming. Alternatively, signal input 174 is incapable of identifying the metadata carried within programming deliverable to entertainment module 108.

The metadata, in one illustrative embodiment of the present invention, is included in the in-band, i.e., vertical blanking interval, the horizontal blanking interval, the overscan region, or the like. In another configuration, the metadata is included in the out-of-band portion of the programming. In one embodiment, the metadata includes control signals developed, created, or otherwise promulgated by the Advanced Television Enhancement Forum, which are referred to herein as ATVEF control signals.

Illustratively, the metadata, such as ATVEF control signals, includes one or more announcements, triggers, packages, and the like as understood and known by one skilled in the art. For example, an announcement identifies the availability of an enhanced programming content, a trigger initiates delivery of the enhanced programming content, and a package stores or identifies the location or source of the enhanced programming content. Although reference is made to ATVEF control signals as the metadata, one skilled in the art can identify various other formats of metadata that are capable of defining the availability of enhanced programming content.

According to another aspect of receiver module 140, signal input 174 can include one or more tuners 178 capable of tuning to the programming or enhanced programming content deliverable by head end 106. Additionally, signal input 174 can include one or more signal decoders 176 optionally configured to (i) decipher the audio and/or video data representative of the programming and/or enhanced programming content received from head end 106, (ii) convert the data from an analog format to digital format, and vice versa, and (iii) decompress the programming and/or enhanced programming content received from head end 106.

To facilitate communication between head end 106 and entertainment module 108, signal input 174 can include a modem 180 that translates the signals from head end 106 into locally readable/executable Internet content, including but not limited to: HTML, XML, Streaming Media formats and other common "Web" encoding methods that enable receiver module 140 to display Web pages including text, graphics and other static media/data and streaming media or other continuous media from remote sources. In such a case, head end 106 can have the form of a remote computer, which forms part of the Internet or some other wide area network or local area network. In other embodiments of the present invention, signal input 174 can include modem 180 but is incapable of translating the signals from head end 106 into locally readable/executable Internet content.

As illustrated, receiver module 140 includes various input/output interfaces 182 that enable a user, consumer electronic devices, signal sources, or other suitable electronic devices to deliver and receive data or information therebetween. For instance, illustrative input/output interfaces include but are not limited to serial port interface, parallel port interface, infra-red interfaces, wireless interfaces, a universal serial bus (USB), Small Computer System Interface (SCSI), or the like. Further, input/output interface 182 is communicatively coupled to an input device 184 over an input link 186 to enable control of entertainment module 108. The input device 184, in one embodiment, generates electronic instructions over input link 186 in response to preprogrammed data or in response to a viewer pressing buttons on input device 184. Input device 184 may also control Web browser software within receiver module 140 as when receiver module 140 acts as an Internet terminal that has been adapted to perform various operations.

Figure 4:
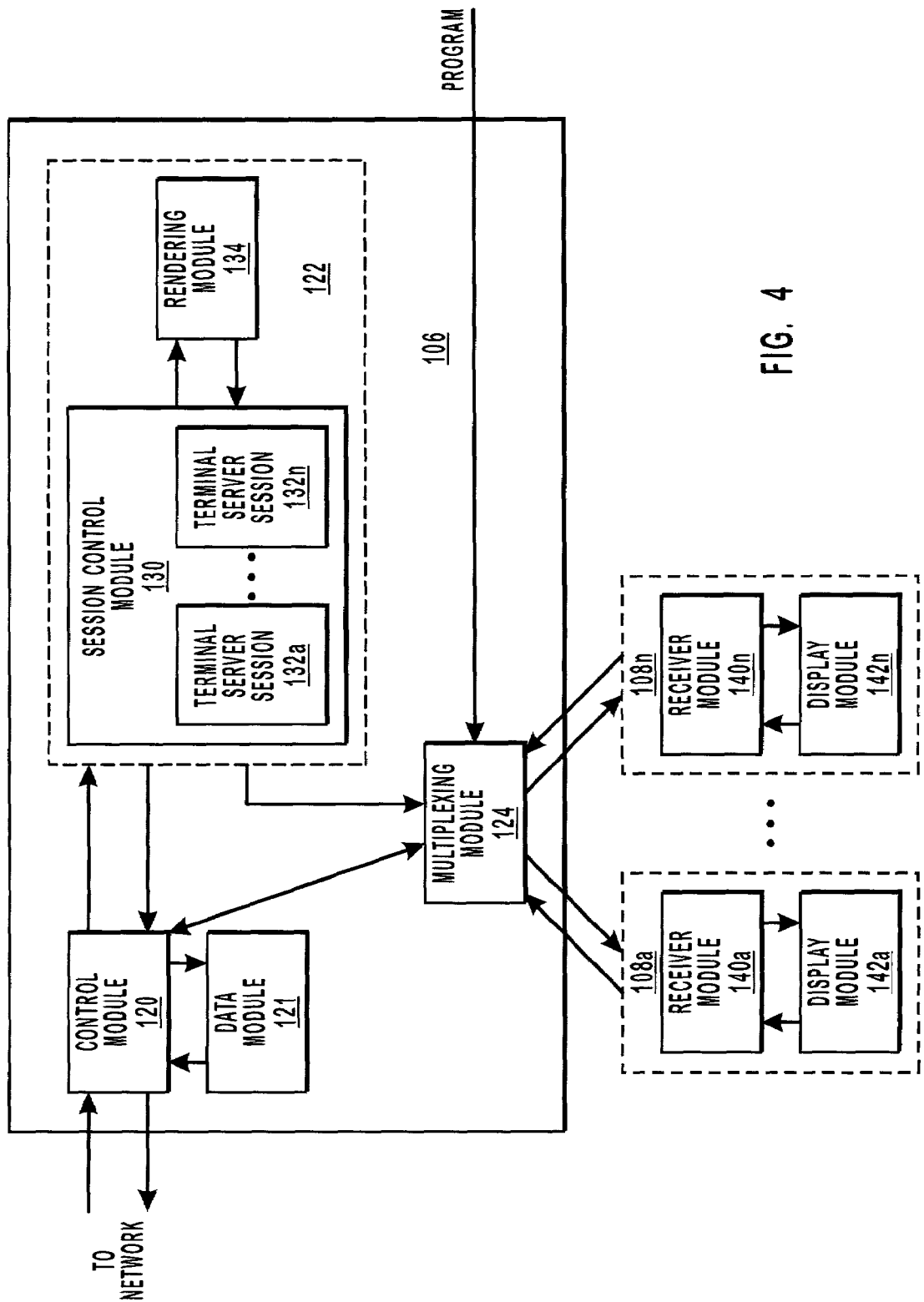
FIG. 4 illustrates a more detailed representation of a head end of the exemplary system of FIG. 2.

Referring now to FIG. 4, depicted is a more detailed schematic representation of a portion of system 100. As illustrated, head end 106 communicates with one or more entertainment modules 108a–108n. The head end 106 delivers enhanced programming content and programming to entertainment modules 108a–108n and receives signals or data indicative of a request by a viewer utilizing entertainment modules 108a–108n to participate in an enhanced programming experience, i.e., watch and/or interact with enhanced programming content. These signals include all or a portion of the copy of the metadata delivered to entertainment module 108a–108n by head end 106. For example, the signal includes a uniform resource locator (URL) for the available enhanced programming content, whether or not the URL leads control module 120 to web servers 102a–102n (FIG. 2) or data module 121. This URL can be included as part of the metadata delivered to entertainment module 108a–108n.

In another configuration, the signal includes an identifier defining the particular programming being viewed through entertainment module 108a–108n. By comparing this program identifier against a stored table or list of available enhanced programming content, head end 106 identifies the enhanced programming content, if any, which is associated with the currently viewed programming. Alternatively, the signal includes other metadata delivered to entertainment module 108a–108n that indicates the specific enhanced programming content or generally available enhanced programming content accessible by head end 106.

In the exemplary representation of head end 106 depicted in FIG. 4, head end 106 includes a control module 120, an access channel module 122, and a multiplexing module 124. Control module 120 is a control center and processing unit for head end 106. Control module 120, therefore, manages access to the services and resources of head end 106 by entertainment modules 108a–108n. Illustratively, when an entertainment module connects to head end 106, control module 120 accesses a data module 121 and the data stored therein to: (i) verify that each entertainment module 108a–108n is correctly connected to head end 106; (ii) authenticate requests delivered from entertainment modules 108a–108n for enhanced programming content and/or programming; (iii) store data or information about each entertainment module 108a–108n and the viewers utilizing the same; and (iv) verify access rights of each entertainment module 108a–108n and the viewers utilizing the same to access available services, pay-per-view, or the like.

Data module 121 can be a database that stores information or data about each entertainment module 108a–108n and/or the viewers utilizing the same. Further, data module 121 can store enhanced programming content that is retrieved by control module 120.

In addition to the above, control module 120 delivers requests to one or more web servers 102a–102n (FIG. 2) for enhanced programming content. Subsequently, control module 120 can retrieve the same and deliver the enhanced programming content to access channel module 122 and/or optionally store the enhanced programming content in data module 121.

Communicating with control module 120 is access channel module 122, which receives requests for enhanced programming content from entertainment modules 108a–108n and delivers these requests to control module 120 to enable control module 120 to retrieve the requested enhanced programming content. Additionally, access channel module 122 interprets and renders the retrieved enhanced programming content before delivering the rendered enhanced programming content to multiplexing module 124 for delivery to entertainment modules 108a–108n.

To achieve the above, in one embodiment of the present invention, access channel module 122 includes a session control module 130. Session control module 130 interprets the signals or requests for enhanced programming content made by entertainment modules 108a–108n. Upon identifying that an entertainment module, such as entertainment module 108a, has requested enhanced programming content, session control module 130 generates a terminal server session 132 for the entertainment module that has issued the request. The terminal server sessions 132a–132n, each being associated with an entertainment module 108a–108n, initiate the delivery of requests to control module 120 to retrieve the requested enhanced programming content. For instance, each terminal server session 132a–132n can access or call software programs or applications that make the request for the enhanced programming content.

Upon receiving the requested enhanced programming content, each terminal server session 132a–132n accesses a rendering module 134 that renders the enhanced programming content and optionally stores the rendered enhanced programming content in access channel module 122 and/or data module 121. Specifically, rendering module 134 prepares a sequence of MPEG images or frames of the available enhanced programming content to be delivered with the programming received from program module 110 (FIG. 2). In this manner, access channel module 122 provides the viewer of entertainment module 108a–108n with an enhanced programming experience without entertainment module 108a–108n and/or receiver module 140a–140n having the capability of otherwise rendering enhanced programming content.

In one configuration, rendering module 134 captures a defined number of images or frames of the available enhanced programming content that can be delivered to entertainment module 108a–108n. In one embodiment, to achieve the creation of a sequence of captured images or frames of the enhanced programming content, rendering module 134 utilizes Microsoft® TV Simulator, Microsoft® TV Browser, or other similar applications. One skilled in the art can identify various other applications capable of capturing images or frames of enhanced programming content.

The captured images or frames are delivered to entertainment modules 108a–108n upon an MPEG stream tunable by each entertainment module 108a–108n. In one embodiment, the MPEG stream of captured images or frames is displayed instead of the programming delivered to entertainment module 108a–108n, i.e., receiver module 140 tunes to the MPEG stream carrying the captured images or frames upon the viewer selecting to participate in an enhanced programming experience. In other embodiments, such as when each entertainment module 108a–108n includes two tuners, each entertainment module 108a–108n tunes to both the programming and the MPEG stream carrying the captured images or frames.

According to one embodiment, rendering module 134 accesses the enhanced programming content and captures approximately fifteen frames per second of enhanced programming content instead of the typical thirty frames per second. By so doing, rendering module 134 reduces the number of frames of enhanced programming content deliverable to entertainment modules 108a–108n and eliminates the need for rendering of the enhanced programming content by entertainment modules 108a–108n. Therefore, the manufacturing and purchase costs of such entertainment modules 108a–108n are reduced.

Although reference is made to capturing fifteen frames per second, it can be appreciated that various numbers of frames can be captured and subsequently delivered to entertainment modules 108a–108n. For instance, rendering module 134 can capture a greater or lesser number of frames per second than described above. By varying the number of frames captured, rendering module 134 can vary the quality of enhanced programming experience that a viewer receives. The larger the number of frames captured, the better the quality of the enhanced programming experience.

Although reference is made to a separate rendering module 134, rendering module 134 can be incorporated within session control module 130 or some other module of access channel module 122 or head end 106.

Access channel module 120, through terminal server sessions 132a–132n, delivers the rendered enhanced programming content to multiplexing module 124 continuously, periodically, or sporadically. The multiplexing module 124 combines the programming from program module 110 and the rendered enhanced programming content into an MPEG and/or data stream specific to the entertainment module requesting the enhanced programming content. Alternatively, multiplexing module 124 can combine the rendered enhanced programming content with audio programming, video programming, data, or the like.

One skilled in the art can identify various manners to combine rendered enhanced programming content with audio and/or video into signals or streams deliverable to entertainment modules 108a–108n. For example, such enhanced programming content can be stored in the out-of-band or in-band portions of the stream carrying the programming to entertainment modules 108a–108n. In still another configuration, multiplexing module 124 combines one or more video channels, one or more audio channels, one or more data channels, and the rendered enhanced programming content through some other mechanism or method known by one skilled in the art.

Figure 5:
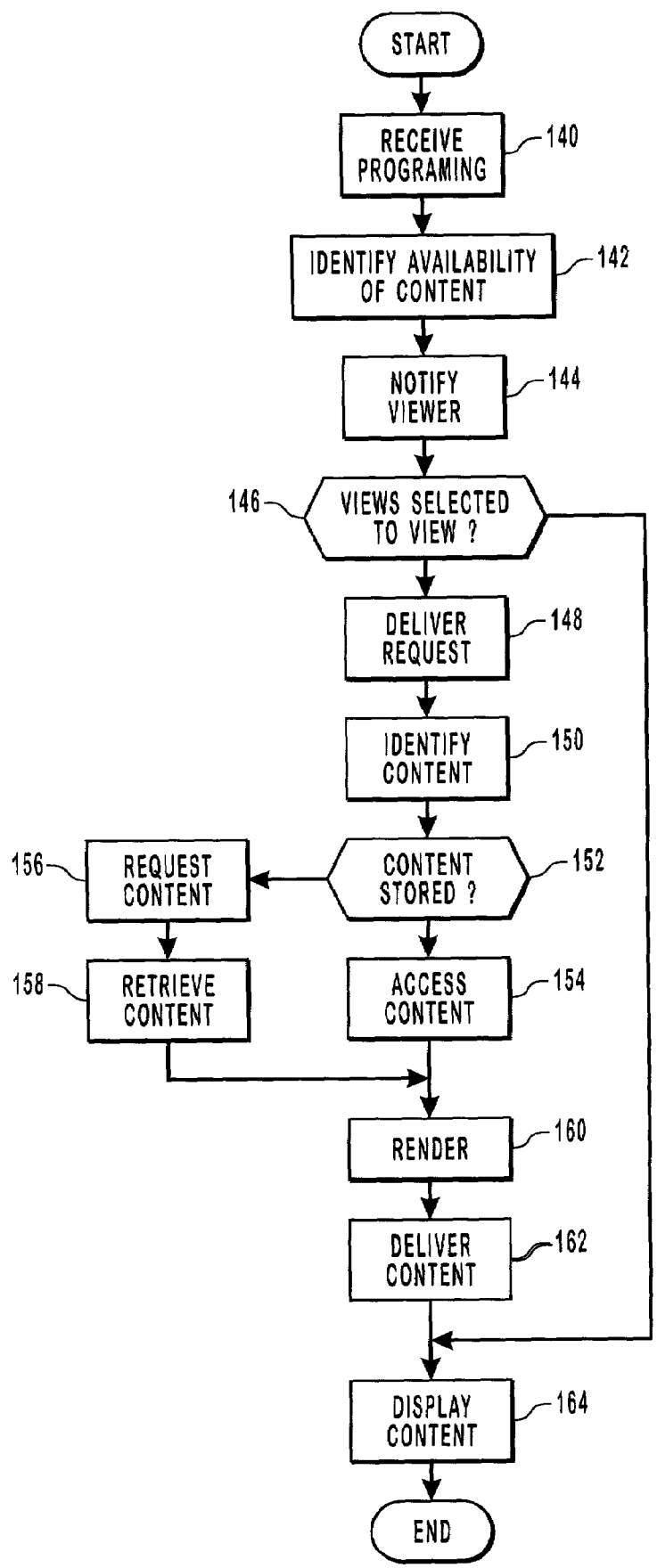
FIG. 5 is an illustrative flow diagram representing one embodiment of the flow of data in the system of FIGS. 2–4.

Referring now to FIG. 5, depicted is a flow diagram illustrating one method of the present invention. As described, an entertainment module receives programming, as represented by block 140. The entertainment module receives the programming that is received by the head end from the program module. The programming includes metadata that describes what enhanced programming content, if any, is associated with the programming. Stated another way, the programming includes metadata that defines what enhanced programming experience the viewer can view in place of or in addition to the conventional television programming.

Upon receiving the programming, the entertainment module, and more specifically the receiver module, identifies the availability of enhanced programming content, as represented by block 142. This can be achieved by processor 148 and/or signal input 174 (FIG. 3) searching the in-band and/or out-of-band portions of the programming for metadata. When such metadata is detected, processor 148 and/or signal input 174 retrieves the data contained therein and notifies the viewer of the availability of an enhanced programming experience, as represented by block 144. The notification includes presenting a selectable icon to the viewer simultaneously with the programming upon the display device. Alternatively, the input device 184 can include a light that becomes illuminated when enhanced programming content is available for the currently viewed programming. It can be appreciated by one skilled in the art that various manners are known by which a viewer can be notified of the availability of enhanced programming content.

Once the viewer has been notified of the availability of enhanced programming content, the viewer can select to watch or participate in the enhanced programming content, as represented by decision block 146. The viewer can select the enhanced programming content by pressing one or more buttons on input device 184 that initiate the delivery of the enhanced programming content. For instance, through pressing one or more buttons the viewer can select a displayed icon.

Following selecting to watch or participate in the enhanced programming content, i.e., decision block 146 in the affirmative, the entertainment module delivers a request for the enhanced programming content to the head end, as represented by block 148. This request can include any or all portions of the metadata received by the entertainment module with the programming. For instance, the request includes an identifier defining the enhanced programming content to be retrieved. In another configuration, the request includes an identifier defining the programming viewed using the entertainment module. In still another configuration, the request includes a URL defining where the data associated with the enhanced programming content is stored, whether the URL defines a location local to or remote from the head end. Alternatively, the request can define a particular package referenced within ATVEF compliant metadata. Various other parameters or data can be delivered as a request to the entertainment module.

Once the request is received, the head end identifies what particular enhanced programming content has been requested, as represented by block 150. The head end can analyze the request to select the identifier of the enhanced programming content or the URL where enhanced programming content data is stored, or the like. Further, when the identifier references the programming, the head end, and more specifically the access channel module, can search a table or list of the programming deliverable to the entertainment module. This table or list is linked or cross-referenced to the table or list of available enhanced programming content. Consequently, by identifying the programming being viewed the access channel module identifies the available enhanced programming content.

Upon identifying the particular enhanced programming content requested or associated with the programming, the head end determines whether the enhanced programming content is stored at the head end, as represented by decision block 152. This can be achieved, in one configuration, as the head end compares the identifier or URL included in the request against a list or table of the available enhanced programming content. In the event that the enhanced programming content is stored at the head end, the head end accesses the enhanced programming content, as represented by block 154. Otherwise, such as when decision block 152 is in the negative, a terminal server session initiated by the access channel module requests the control module to request the enhanced programming content from the remote source, i.e., web servers, as represented by block 156. Consequently, the control module delivers a request to the remote sources and receives the enhanced programming content, as represented by block 158.

Following retrieval of the enhanced programming content, the head end renders the enhanced programming content, as represented by block 160. In one embodiment, the rendering module renders only fifteen frames per second of the enhanced programming content rather than rendering all frames of the enhanced programming content. In other embodiments of the present invention, the rendering module renders a lesser or greater number of frames than the fifteen frames per second discussed herein.

Once the enhanced programming content is rendered, the access channel module delivers the rendered enhanced programming content to the entertainment module, as represented by block 162. For instance, the multiplexing module inserts the captured images or frames onto an MPEG or data stream deliverable to the entertainment module. In this manner, the entertainment module is able to display the enhanced programming experience to the viewer, as represented by block 164. More specifically, the entertainment module displays only the enhanced programming content, such as when the entertainment module includes only a single tuner, or can display the enhanced programming content and the programming when the entertainment module includes two or more tuners.

Figure 6:
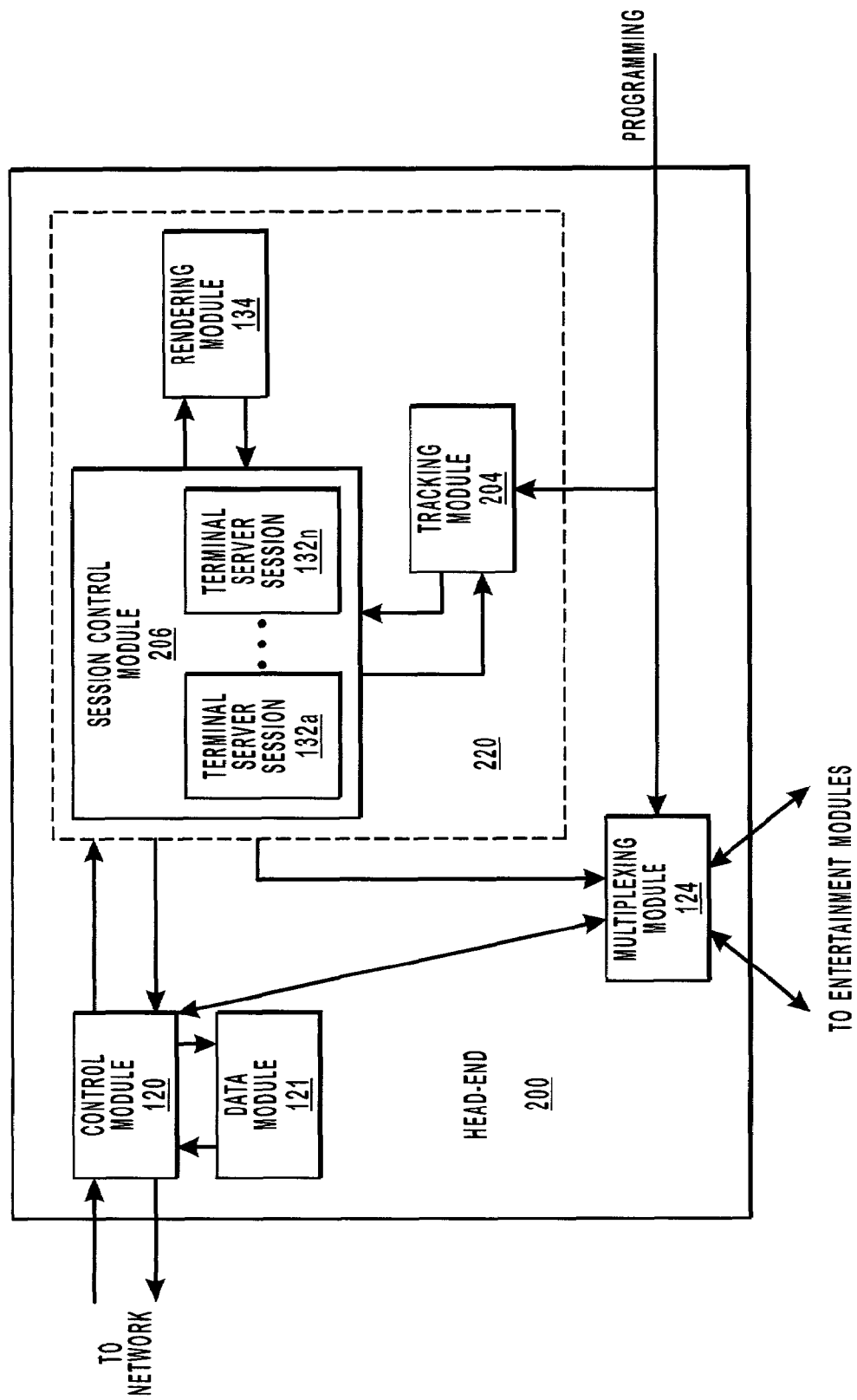
FIG. 6 illustrates a more detailed representation of another embodiment of a head end of the exemplary system of FIG. 2.

In one embodiment, the rendered enhanced programming content delivered and displayable by the entertainment module uses a number of frames or images less than the programming displayed to the viewer, i.e., less than approximately thirty frames per second. Although the number of frames is lower, the viewer is able to watch and/or view the enhanced programming experience with little adverse effects to the quality of the enhanced programming experience provided by advanced, complex, and expensive set-top boxes or receivers. In other embodiments of the present invention, the rendered enhanced programming content includes substantially the same number of frames as the programming delivered to and displayed by the entertainment module. Referring now to FIG. 6, depicted is an alternate embodiment of the head end of the present invention. Like modules, elements, or features of head end 106 are indicated with like reference numerals. The illustrative configuration of the present invention depicted in FIG. 6 will be described with respect to use of entertainment modules 108a–108n that are incapable of identifying the availability of enhanced programming content associated with received programming. To enable these types of entertainment modules 108a–108n to receive the enhanced programming content, a head end 200 tracks the availability of enhanced programming content, notifies entertainment module 108a–108n of the availability of enhanced programming content, and subsequently delivers rendered enhanced programming content to entertainment modules 108a–108n.

As illustrated, head end 200 includes a control module 120, an access channel module 202, and a multiplexing module 124. Access channel module 202 tracks the availability of enhanced programming content, requests the enhanced programming content, and stores the requested enhanced programming. Consequently, access channel module 202 includes a tracking module 204, a session control module 206, and a rendering module 134.

Tracking module 204 analyzes the programming delivered to multiplexing module 124 to identify and track the delivery of metadata to entertainment modules 108a–108n. The metadata defines the availability of enhanced programming content accessible by the viewer of the programming at entertainment module 108a–108n. Upon identifying the inclusion of metadata within the programming, whether in the in-band or out-of-band portion of the programming, tracking module 204 delivers data indicative of programming and the metadata identified or tracked by tracking module to session control module 206.

Session control module 206 prepares a notice of availability of enhanced programming content to be delivered to entertainment modules 108a–108n that are viewing the associated programming This notice is included in the in-band or out-of-band portion of the programming delivered to entertainment modules 108a–108n and displayed to the viewer. Alternatively, the data indicative of the notice can result in a visual, audible, and/or tactile notification of enhanced programming content availability to the viewer. For instance, in one embodiment, input device 184 (FIG. 3) can include a liquid crystal diode (LCD) that becomes illuminated when enhanced programming content is available. Various other manners are known to identify the availability of enhanced programming content.

When the viewer selects to watch or participate in the enhanced programming content, entertainment module 108a–108n delivers data indicative of such an action to head end 200. For instance, the data can be included in a back channel signal delivered to head end 200. This data is analyzed by session control module 206, resulting in the beginning of one or more terminal server sessions 132a–132n. Each terminal server session 132a–132n initiates a request for the desired enhanced programming content from control module 120. Control module 120 analyzes data module 121 to determine if the enhanced programming content is stored therein. When a copy of the enhanced programming content is stored in data module 121, control module 120 retrieves the same and delivers to rendering module 134. Thereafter, rendering module 134 renders the enhanced programming content and terminal server sessions 132a–132n initiate delivery of the rendered enhanced programming content to multiplexing module 124, as discussed previously with respect to head end 106. It can be understood that when rendered versions of previously retrieved enhanced programming content are stored in data module 121, terminal server sessions 132a–132 causes control module 120 to deliver the stored rendered enhanced programming content directly to multiplexing module 124.

When the enhanced programming content is not stored in data module 121, terminal server session 132a–132n requests control module 120 to retrieve the enhanced programming content from web servers 102a–102n (FIG. 2). Once control module 120 retrieves the enhanced programming content, rendering module 134 renders the enhanced programming content and the rendered enhanced programming content is delivered to multiplexing module 124 for delivery to entertainment modules 108a–108n, as described previously with respect to head end 106.

Figure 7:
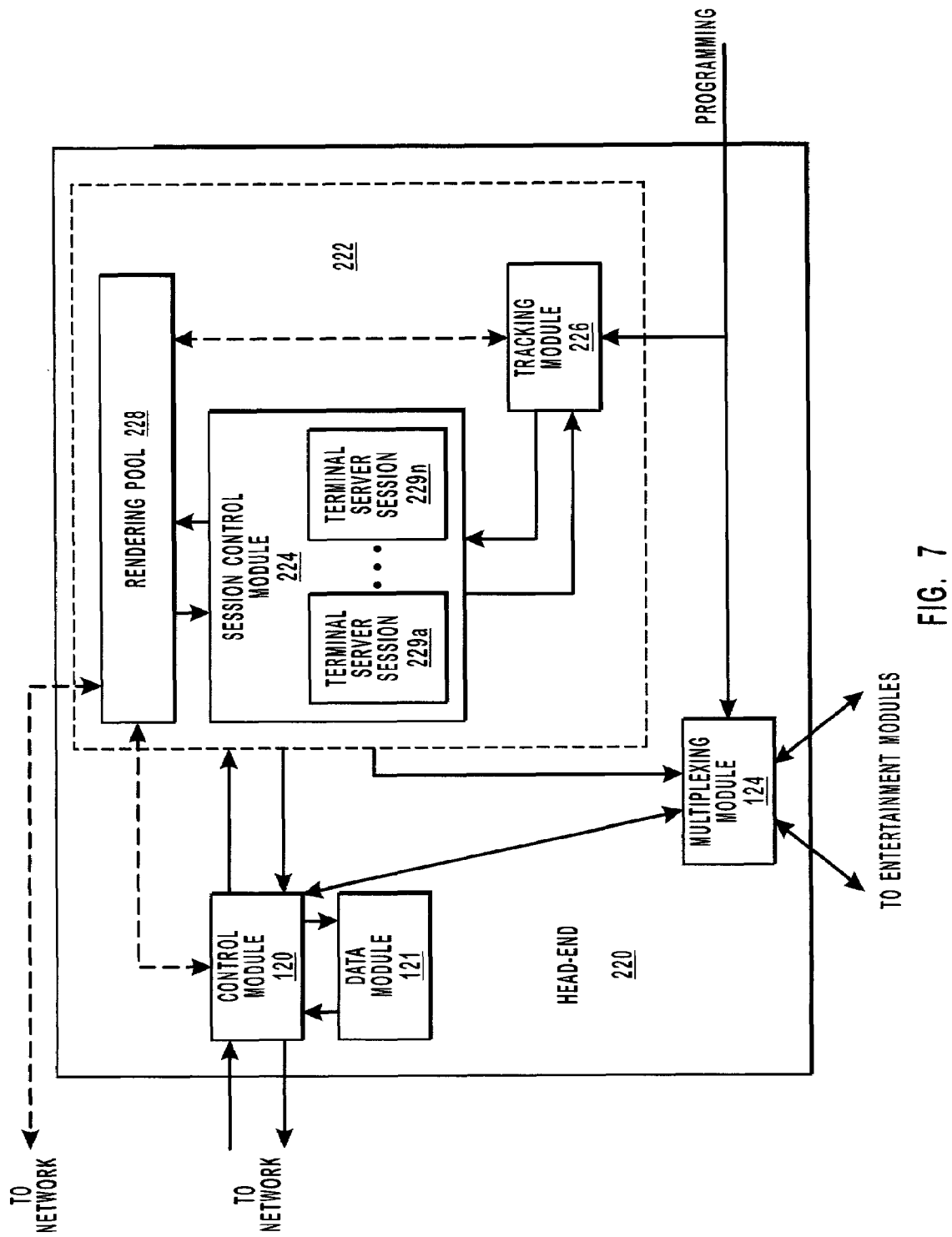
FIG. 7 illustrates a more detailed representation of yet another embodiment of a head end of the exemplary system of FIG. 2.

Referring now to FIG. 7, depicted is another embodiment of the head end of the present invention. The head end 220 of this embodiment includes an access channel module 222 having a session control module 224, a tracking module 226, and a rendering pool 228. This embodiment will be discussed with reference to tracking the availability of enhanced programming content by access channel module 222 and subsequently retrieving rendered enhanced programming content for delivery to one or more entertainment modules.

As shown, session control module 224 communicates with both tracking module 226 and rendering pool 228. Tracking module 226 is configured to analyze the programming delivered to multiplexing module 124 to identify and track the delivery of metadata to the entertainment modules. Additionally, tracking module 226 delivers data indicative of programming and the metadata identified or tracked by tracking module 226 to session control module 224 and rendering pool 228.

The rendering pool 228 in one embodiment, represents a server pool or server farm of multiple servers that are tuned or responsible for tracking and controlling the availability of enhanced programming content on each channel of programming delivered by programming module 110 (FIG. 2). Stated another way, rendering pool 228, optionally in combination with tracking module 226, tracks programming delivered to the entertainment modules by programming module 110. Rendering pool 228, therefore, includes one or more dedicated servers separately tuned to a particular programming channel or non-dedicated servers capable of tuning to any channel viewable by an individual using entertainment module. When a server identifies the availability of enhanced programming content, either by tracking module 226 or session control module 224 notifying the server of such an event or by the server determining that enhanced programming content is available, the server tunes or otherwise accesses the enhanced programming content, renders the enhanced programming content, and optionally stores the same. The servers within rendering pool 228 can request such enhanced programming content from web servers 102a–102n (FIG. 2) through a combination of session control module 224 and control module 120, solely through control module 120, or directly from rendering pool 228 to the web servers.

In addition, rendering pool 228 creates one or more visual representations of the enhanced programming content, i.e., captures a sequence of MPEG images or frames of the enhanced programming content associated with specific programming created by programming module 220. This is the case, regardless of whether the enhanced programming content includes web pages, other data or information alone, or a combination of such web pages, data or other information, the programming, or the like.

In one embodiment, to achieve the creation of a plurality of MPEG images or frames of the enhanced programming content, rendering pool 228 utilizes Microsoft® TV Simulator, Microsoft® TV Browser, or other similar application installed upon one or more servers. Such applications, and others known to one skilled in the art, capture images or frames of the enhanced programming content.

Figure 8:
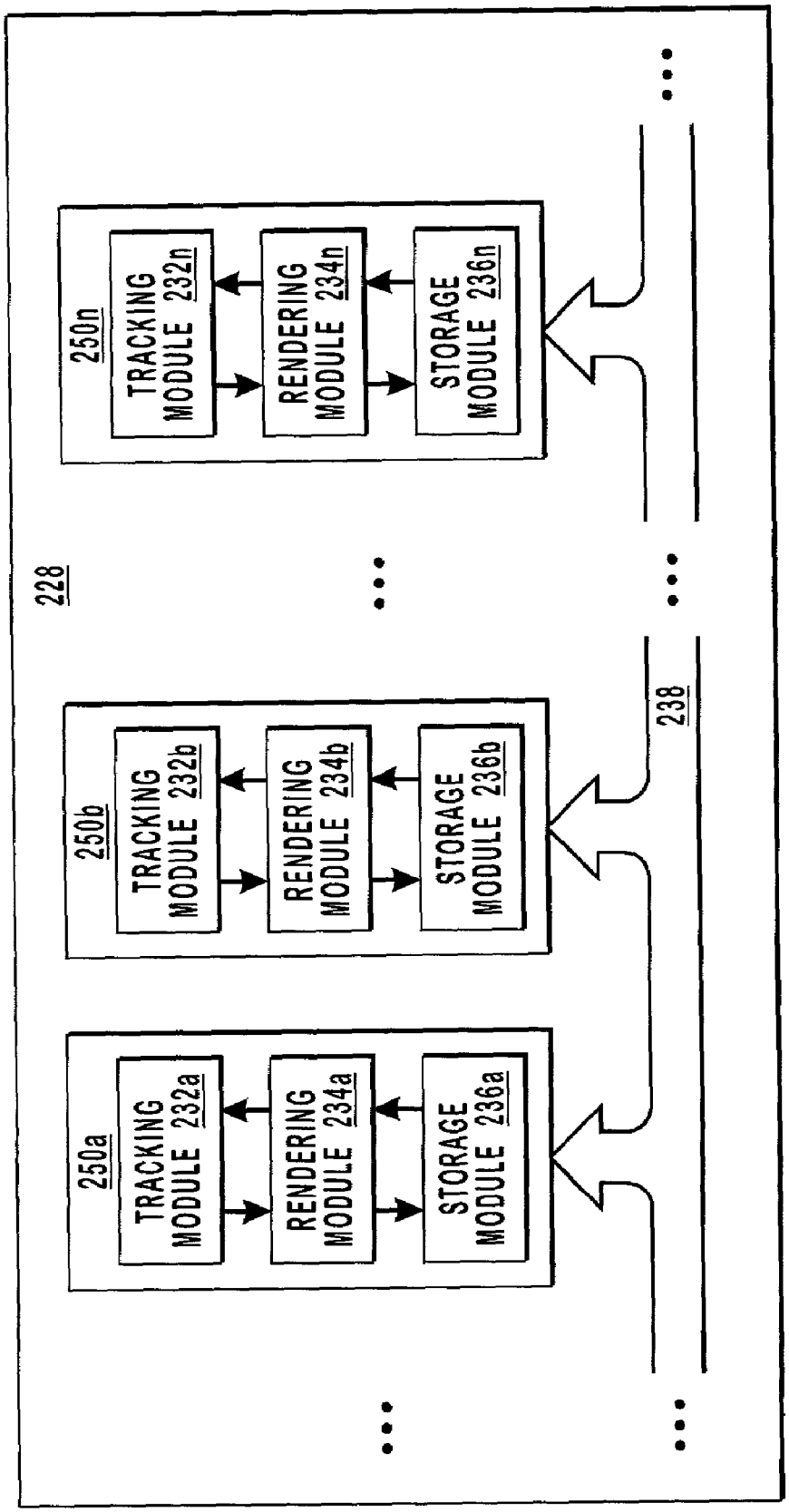
FIG. 8 illustrates a schematic representation of a rendering pool of the head end illustrated in FIG. 7.

Referring now to FIG. 8, one illustrative configuration of rendering pool 228 is depicted. As shown, rendering pool 228 includes a plurality of server modules 250a–250n. Each server module 250a–250n includes a tracking module 232a–232n that has a similar configuration to tracking module 226 described previously. Consequently, one skilled in the art can appreciate that, in some configurations, tracking module 226 may be eliminated from access channel module 220 and server modules 230a–230n substituted therefor.

Communicating with each tracking module 232a–232n or directly with tracking module 226 is a rendering module 234a–234n. Each rendering module 234a–234n is optionally dedicated to request and/or receive enhanced programming content for a particular programming channel delivered to multiplexing module 124. For example, rendering module 234a is capable of requesting and rendering enhanced programming content associated with programming to be displayed on channel 4 of an entertainment module, while another rendering module 234b may be configured to receive and render enhanced programming content associated with channel 5.

In another configuration, each rendering module 234a–234n requests and renders enhanced programming content for any programming deliverable to multiplexing module 124. Therefore, each server module 250a–250n renders any enhanced programming content for any program received from program module 110 (FIG. 2). Generally, each rendering module 234a–234n includes the functionality of rendering module 134 described above and optionally includes a tuner card or other appropriate hardware and/or software that receives and decodes enhanced programming content.

In addition to tracking modules 232a–232n and rendering modules 234a–234n, each server module 250a–250n optionally includes storage modules 236a–236n. Storage modules 236a–236n store the enhanced programming content rendered by rendering modules 234a–234n. In this manner, a store of rendered enhanced programming content is created. The access channel module 220 (FIG. 7) can use this store of enhanced programming content to limit the need to retrieve enhanced programming content directly from web servers 102a–102n (FIG. 2) upon access channel module 220 receiving a request for enhanced programming content. To facilitate access to the stored enhanced programming content, each server module 250a–250n is optionally in communication one with another via a local area network 238.

Illustratively, when an entertainment module requests enhanced programming content, session control module 224 initiates a terminal server session 229a–229n that requests rendered enhanced programming content from rendering pool 228. When each server module 250a–250n is dedicated to a different channel of programming, session control module 224, through terminal server session 229a–229n, requests enhanced programming content from the specific server module 230a–230n rendering the enhanced programming content for the particular programming channel. The server module 250a–250n retrieves rendered enhanced programming content from storage module 236a–236 or data module 121. Alternatively, server module 250a–250n delivers a request to control module 120 for the enhanced programming content, which results in server module 250a–250n rendering the enhanced programming content upon receiving the same.

In this manner, each server module 250a–250n obtains rendered enhanced programming content retrieved from the particular source, such as a web server 102a–102n (FIG. 2), without the need to duplicate efforts and directly contact the actual source of the enhanced programming content.

Figure 9:
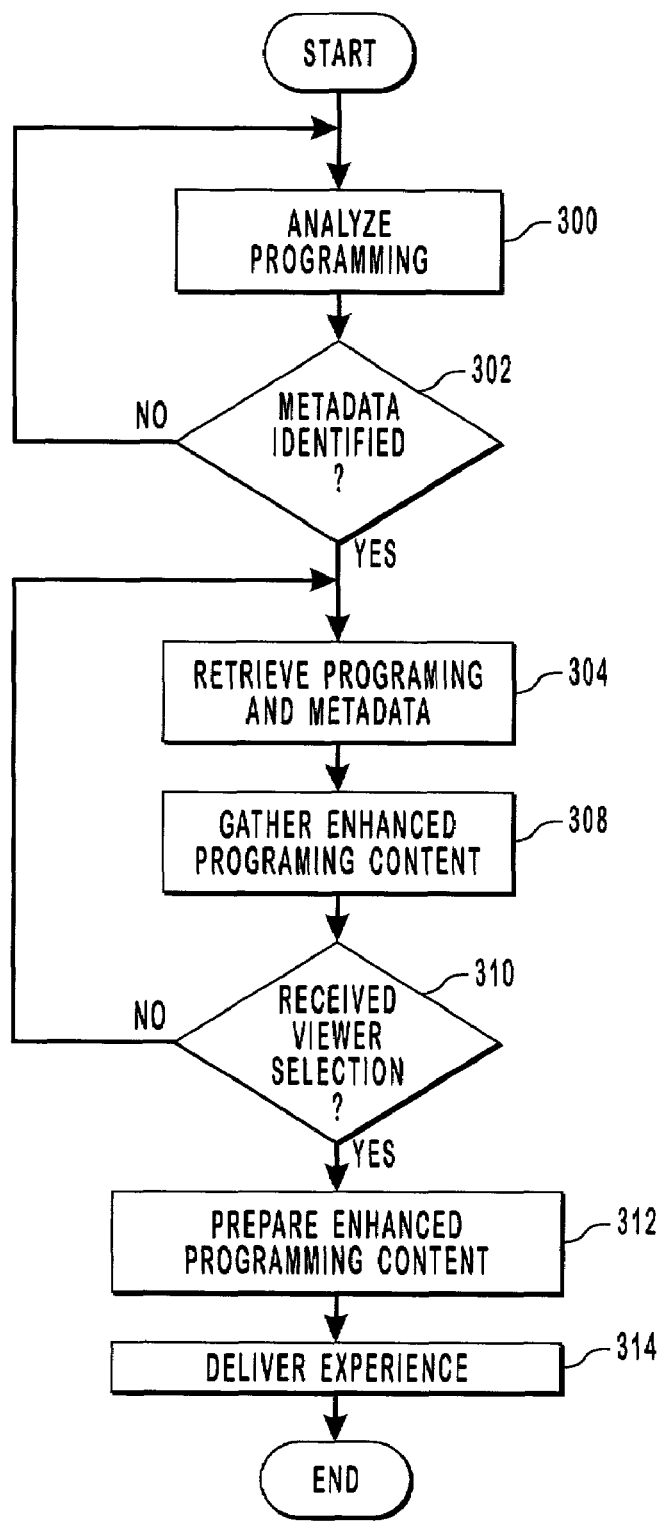
FIG. 9 is an illustrative flow diagram representing one embodiment of the flow of data in the system of FIGS. 7 and 8.

FIG. 9 includes a schematic representation of the flow of data and selections made by one illustrative system of the present invention. Head end 220, in one embodiment, continually or substantially continually analyzes the programming delivered to multiplexing module 124, a represented by block 300. More specifically, tracking module 226 analyzes the audio, video, and data signals contained within the programming awaiting the inclusion of metadata indicating the availability of enhanced programming content. When tracking module 226 identifies the metadata, as represented by decision block 302, tracking module 226 retrieves the programming and the metadata for the particular programming channel upon which the metadata was identified, as represented by block 304. For example, tracking module 226 may identify metadata on the programming for channel 4. Optionally, rendering pool 228 may assist tracking module 226 to retrieve the programming and the metadata.

Once the programming and metadata are retrieved, rendering pool 228 accesses the enhanced programming content associated with the programming, as represented by block 308. Subsequently, rendering pool 228 generates a number of frames or images representative of the enhanced programming content that may be displayed in a sequential order to provide the enhanced programming experience for the viewer.

Rendering pool 228 continues to retrieve and store the enhanced programming content until a viewer selects to begin an enhanced programming experience, as represented by decision block 310. Upon selecting an enhanced programming experience, such as an interactive experience, a control signal is delivered from the entertainment module to head end 220. Such a control signal contains an identifier for the particular the entertainment module requesting the enhanced programming experience and information regarding the particular channel being viewed, i.e., the channel identification number, such as channel 4 in this illustrative example.

Subsequently, session control module 224, through the activated terminal server session, prepares the enhanced programming content for delivery to the entertainment module, as represented by block 312. For example, in one embodiment, the programming is substantially completely substituted by the enhanced programming content requested by the viewer. In this case, the enhanced programming content is delivered to the multiplexing module for delivery to the entertainment module along a different data channel or stream from that upon which the programming was delivered to the entertainment module, as represented by block 314. For example, the enhanced programming content, containing a number of captured frames of the enhanced programming content, is delivered along a different channel and the entertainment module is requested to tune to such other channel by the inclusion of a channel identifier in the transmission of the enhanced programming content.

Alternatively, when the entertainment module includes two tuners, the enhanced programming may be combined with the programming to provide the viewer with an enhanced programming experience that provides the programming and the enhanced programming content simultaneously with the programming. For example, the MPEG images created by each server module 230a–230n are delivered to the entertainment module with the other enhanced programming data. In such a configuration, the data delivered to the entertainment module includes coordinate information defining the location on the display device where either the enhanced programming content or the programming is to be placed. Optionally, the enhanced programming content includes a channel identifier that the entertainment module uses to display the programming, within a video box, to the viewer within a video box. In this case, the entertainment module tunes the internal tuner of the receiver module to the particular channel and subsequently delivers the programming to the viewer. In another optional configuration, coordinate data and data regarding a streaming media video feed are delivered to the entertainment module with the appropriate other enhanced programming content, as represented by blocks 312 and 314.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for remotely preparing enhanced programming content in accordance with selections of a viewer and providing an enhanced programming experience to the viewer of an entertainment module without the entertainment module having to retrieve, interpret or render the enhanced programming content before displaying the same to the viewer, the system comprising:
   (a) an entertainment module configured to display video programming and enhanced programming content to a viewer; and
   (b) an enhancement module for receiving a plurality of broadcast channels of video programming to be delivered to the entertainment module and at least one of creating and retrieving enhanced programming content associated with the video programming provided over the plurality of broadcast channels, the enhancement module comprising:
      (i) a multiplexing module configured to deliver video programming and enhanced programming content to the entertainment module, the programming comprising at least one enhanced programming control signal; and
      (ii) an access channel module, remote from the entertainment module, configured to identify the at least one enhanced programming control signal and render the enhanced programming content into captured images based upon the at least one enhanced programming control signal, the captured images of the enhanced programming being deliverable to the entertainment module, wherein the access channel module comprises plurality of server modules, wherein each of the plurality of server modules is dedicated a particular one of the plurality of broadcast channels of video programming received by the enhancement module, and wherein each of the plurality of server modules is configured to render the enhanced programming content into the captured images of a format that can be displayed by the entertainment module without additional interpretation or rendering.

2. A system as recited in claim 1, wherein the entertainment module comprises a receiver module and a display module.

3. A system as recited in claim 1, wherein the entertainment module comprises a set-top box.

4. A system as recited in claim 1, wherein the video programming further comprises at least one of: (i) an audio stream; and (ii) a data stream.

5. A system as recited in claim 1, wherein the multiplexing module is configured to generate at least one stream that contains the programming from a program module and the enhanced programming content from the access channel module.

6. A system as recited in claim 1, wherein the multiplexing module is configured to combine the programming and the enhanced programming content into a stream deliverable to the entertainment module.

7. A system as recited in claim 6, wherein the stream is different from a stream containing the programming.

8. A system as recited in claim 1, wherein the server modules each comprises a tracking module, the tracking module being configured to search the programming deliverable to the entertainment module for metadata.

9. A system as recited in claim 8, wherein the metadata is an advanced television enhancement forum control signal.

10. A system as recited in claim 8, wherein the plurality of rendering modules form a rendering pool, the rendering pool being configured to render the enhanced programming content retrieved from an enhanced programming data source upon a tracking module receiving metadata.

11. A system as recited in claim 1, wherein the programming comprises a streaming video feed.

12. A system as recited in claim 11, wherein the access channel module is configured to create coordinate data, the coordinate data being configured to define a video box within which the streaming video feed is displayed.

13. A system as recited in claim 11, wherein the access channel module is configured to define coordinate data, the coordinate data being configured to define a video box within which the programming is displayed.

14. A system as recited in claim 13, wherein the entertainment module comprises two tuners, a first tuner configured to receive the programming and a second tuner configured to receive the enhanced programming content, the programming being displayed to a viewer in the video box.

15. A system as recited in claim 1, wherein the entertainment module is capable of identifying metadata included in the programming.

16. A system as recited in claim 15, wherein the entertainment module is capable of requesting the enhanced programming experience associated with the metadata upon receiving an input from the viewer of the entertainment module.

17. A system as recited in claim 1, the enhancement module further comprising:
   a control module for: (A) verifying that the entertainment module is correctly connected to the enhancement module; (B) authenticating requests delivered from the entertainment module for enhanced programming content or programming; (C) storing information about the entertainment module and the viewer; and (D) verifying access rights of the entertainment module and the viewer using the entertainment module.

18. A system as recited in claim 1, wherein each of the plurality of server modules that are each dedicated to a particular video broadcast channel are further configured to identify the availability of enhanced programming content from the particular broadcast channel of video programming to which they are dedicated.

19. A system for remotely preparing enhanced programming content in accordance with selections of a viewer and providing an enhanced programming experience to the viewer of an entertainment module without the entertainment module having to retrieve, interpret or render the enhanced programming content before displaying the same to the user, the system comprising:
   (a) an entertainment module configured to display video programming and enhanced programming content to a viewer, said entertainment module being incapable of directly accessing the enhanced programming content from an enhanced programming data source; and
   (b) an enhancement module for receiving a plurality of channels of video programming that is deliverable to the entertainment module, the enhancement module comprising:
      (i) a multiplexing module configured to deliver video programming and enhanced programming content to the entertainment module, the video programming comprising metadata; and
      (ii) an access channel module, remote from the entertainment module, configured to identify the metadata and to create a plurality of captured images that visually represent the enhanced programming content retrieved from the enhanced programming data source based upon the metadata, the plurality of captured images being deliverable to the entertainment module, wherein the access channel module comprises a rendering pool of a plurality of servers, wherein each of the servers is dedicated to one of the plurality of channels of programming received by the enhancement module, and wherein each of the servers is configured to render the enhanced programming content into the captured images of a format that can be displayed by the entertainment module without additional interpretation of rendering.

20. A system as recited in claim 19, wherein the enhanced programming data source is at least one server.

21. A system as recited in claim 19, wherein the entertainment module comprises a receiver module and a display device.

22. A system as recited in claim 19, wherein the multiplexing module is configured to generate at least one stream containing the programming and the enhanced programming content.

23. A system as recited in claim 19, wherein the access channel module is further configured to create a plurality of images that visually represent the programming.

24. A system as recited in claim 23, wherein the multiplexing module is configured to combine the plurality of images that visually represent the programming with the plurality of images that visually represent the enhanced programming content.

25. A system as recited in claim 24, wherein the multiplexing module delivers the plurality of images on a stream different from the stream that the multiplexing module delivers the programming to the entertainment module.

26. A system as recited in claim 19, wherein the entertainment module is configured to deliver a selection signal to at least one of: (i) the multiplexing module; (ii) and the access channel module, the selection signal representing a selection by a viewer of the entertainment module.

27. A system as recited in claim 19, wherein the one or more servers creates a plurality of MPEG images.

28. A method for providing enhanced programming content to a viewer of an entertainment module, the enhanced programming content being prepared remotely from the entertainment module and delivered to the viewer without the entertainment module having to retrieve, interpret or render the enhanced programming content before displaying the same to the viewer, the method comprising:
   (a) a step for analyzing a video programming stream deliverable to an entertainment module to identify whether the stream comprises metadata associated with the video programming;
   (b) in the event that the stream comprises metadata, in a plurality of rendering servers each dedicated to one of a plurality of video programming streams, a step for preparing, remotely from the entertainment module, the enhanced programming content into captured images based upon the metadata, and in a format that can be displayed by the entertainment module without additional interpretation of rendering; and
   (c) a step for delivering the enhanced programming content to the entertainment module in response to the entertainment module requesting the enhanced programming.

29. A method as recited in claim 28, wherein the step for analyzing comprises separating the metadata from the stream deliverable to the entertainment system.

30. A method as recited in claim 28, wherein the metadata comprises an advanced television enhancement forum signal.

31. A method as recited in claim 28, further comprising a step for storing the programming and the metadata.

32. A method as recited in claim 28, further comprising a step for identifying a viewer selection signal, the viewer selection signal identifying that the entertainment module is to receive the enhanced programming content.

33. A method as recited in claim 32, wherein the step for identifying the viewer selection signal comprises:
   (a) analyzing a selection signal transmitted by the entertainment module, the selection signal comprising an entertainment module identifier; and
   (b) identifying the entertainment module identifier.

34. A method as recited in claim 28, wherein the preparing step comprises:
   (a) retrieving from a data source data representative of the enhanced programming content; and
   (b) combining the data with the programming, the combined data and the programming creating the enhanced programming experience.

35. A method as recited in claim 34, wherein the combining step comprises identifying coordinate data of a video box capable of displaying the programming to the viewer.

36. A method as recited in claim 34, wherein the combining step comprises:
  (a) identifying an entertainment module identifier that uniquely references the entertainment module;
  (b) identifying a stream containing the programming for delivery to the entertainment module; and
  (c) identifying a video box capable of displaying the programming carried upon the transmission stream to the viewer.

37. A method as recited in claim 28, wherein the preparing step comprises:
  (a) retrieving data representative of the enhanced programming content from a data module; and
  (b) substituting the enhanced programming content for the programming.

38. A method as recited in claim 28, wherein the delivering step comprises inserting at least one of the programming and the enhanced programming content onto an MPEG stream.

39. A method as recited in claim 28, wherein the delivering step comprises delivering a plurality of frames representative of the enhanced programming experience to the entertainment module, the plurality of frames substantially less than or equal to thirty frames per second.

40. A method as recited in claim 28, wherein the preparing step comprises rendering the enhanced programming content.

41. A system as recited in claim 28, wherein each of the plurality of rendering servers is in communication with another of the plurality of rendering servers.

42. A method for providing an enhanced programming experience to a viewer of an entertainment module where a visual representation of the enhanced programming experience is prepared remotely from the entertainment module and is delivered to the viewer without the entertainment module having to retrieve, interpret or render the enhanced programming content before displaying the same to the user, the method comprising:
  (a) an act of receiving and analyzing at least one of a plurality of programming streams, each programming stream comprising an audio stream and a video stream, and identifying whether at least one of the plurality of programming streams comprises metadata;
  (b) when at least one of the plurality of programming streams includes metadata, an act of notifying a rendering pool of the metadata, the rendering pool comprising a plurality of servers at least temporarily dedicated to a particular one of the plurality of programming streams;
  (c) the act of at least one of the plurality of servers preparing, for delivery to the entertainment module, a visual representation of the enhanced programming content identified by the metadata, and in a format that can be displayed by the entertainment module without additional interpretation of rendering; and
  (d) when the viewer selects to begin the enhanced programming experience, the act of transmitting to the entertainment module, in response to the viewer's selection, the visual representation of the enhanced programming content.

43. A method recited in claim 42, wherein the at least one server is tunable to any of a plurality of programming streams.

44. A method as recited in claim 42, wherein the act of notifying comprises delivering a notice of availability of enhanced programming content to a plurality of servers.

45. In a system for providing an enhanced programming experience to a viewer of an entertainment module, a computer-readable storage having computer-executable instructions comprising:
  (a) an entertainment module configured to display video programming and enhanced programming content to a viewer;
  (b) a multiplexing module configured to receive a plurality of video channels of programming and deliver the programming and enhanced programming content to the entertainment module, the video programming comprising metadata; and
  (c) an access control module, remote from the entertainment module, configured to identify the metadata and render the enhanced programming content into captured images based upon the metadata, the access control module including a plurality of rendering modules for rendering the enhanced programming content into captured images of a format which can be displayed by the entertainment module without additional interpretation of rendering, each of the plurality of rendering modules being dedicated to a particular broadcast channel of the received plurality of channels of video programming.

46. In a system for providing an enhanced programming experience to a viewer of an entertainment module, and without the entertainment module retrieving, interpreting or rendering the enhanced programming content, a computer-readable storage having computer-executable instructions comprising:
  (a) an access channel module, remote from an entertainment module, configured to identify metadata in video programming deliverable to the entertainment module and render the enhanced programming content into captured images for delivery to the entertainment module, the access channel module having a plurality of rendering modules, each of the plurality of rendering modules being dedicated to a different video programming broadcast channel selected from among a plurality of programming broadcast channels and rendering the enhanced programming content into captured images that can be displayed by the entertainment module without additional interpretation or rendering; and
  (b) a multiplexing module, in communication with the access channel module, configured to receive the plurality of video programming broadcast channels and deliver at least one of the video programming and the rendered enhanced programming to the entertainment module.

47. A computer product for implementing a method for providing enhanced programming content to a viewer of an entertainment module where the enhanced programming content is prepared remotely from the entertainment module and delivered such that the entertainment module does not need to retrieve, interpret or render the enhanced programming content, the computer program product comprising:
  a computer-readable storage carrying computer-executable instructions for implementing the method where the computer-executable instructions comprise:
    program code means for analyzing a stream of programming deliverable to an entertainment module, remotely from the entertainment module, to identify whether the stream comprises metadata associated with the programming;

program code means for, in the event that the stream comprises metadata, remotely from the entertainment module, rendering the enhanced programming content identified by the metadata into captured images with a plurality of rendering modules each dedicated to a particular received video programming broadcast channel, and wherein each of the plurality of dedicated rendering modules renders the enhanced programming content into captured images of a format that can be displayed by the entertainment module without additional interpretation or rendering; and program code means for thereafter delivering the enhanced programming content to the entertainment module for display to a viewer in response to the entertainment module requesting the enhanced programming content.

* * * * *